NEGATIVE RESISTANCE DIODE TRIGGER CIRCUIT

Filed Nov. 10, 1960 3 Sheets-Sheet 1

INVENTOR
R. A. KAENEL
BY Lucian C. Canepa
ATTORNEY

INVENTOR
R. A. KAENEL
BY Lucian C. Canepa
ATTORNEY

NEGATIVE RESISTANCE DIODE TRIGGER CIRCUIT

Filed Nov. 10, 1960 3 Sheets-Sheet 3

INVENTOR
R. A. KAENEL
BY Lucian C. Canepa
ATTORNEY

United States Patent Office 3,204,129

Patented Aug. 31, 1965

3,204,129
NEGATIVE RESISTANCE DIODE TRIGGER CIRCUIT

Reginald A. Kaenel, Murray Hill, N.J., assignor to Bell Telephone Laboratories, Incorporated, New York, N.Y., a corporation of New York Filed Nov. 10, 1960, Ser. No. 68,401
10 Claims. (Cl. 307—88.5)

This invention relates to signal translating circuits, and more particularly to trigger circuits employing negative resistance diodes.

Trigger or flip-flop circuits are characterized by two equilibrium conditions and can be successively switched from one of these conditions to the other in respective response to the application thereto of identical trigger pulses. The usefulness of such circuits in a wide variety of electrical signal translating arrangements is well known.

An object of the present invention is the improvement of trigger circuits.

More specifically, an object of this invention is the provision of trigger circuits which are characterized by high speed, low power dissipation, high reliability, and extreme simplicity of design.

These and other objects of the present invention are realized in a specific illustrative embodiment thereof which comprises a single negative resistance diode of the voltage-controlled type connected in series with an inductor, a resistor, and a bias source, the values of the resistor and the source being selected to bias the diode for bistable operation. Connected in parallel with the diode is a trigger source that supplies identical bipolar pulses each of which is effective to switch the diode from one to the other of its two stable conditions.

It is a feature of the present invention that a trigger circuit include a single voltage-controlled negative resistance diode biased for bistable operation, and an inductor connected in series with the diode.

It is another feature of this invention that a trigger circuit include a single voltage-controlled negative resistance diode biased for bistable operation, an inductor connected in series with the diode, and a bipolar trigger pulse source connected in parallel with the diode.

A complete understanding of the present invention and of the above and other features and advantages thereof may be gained from a consideration of the following detailed description of an illustrative embodiment thereof presented hereinbelow in connection with the accompanying drawing, in which.

Figure 1:
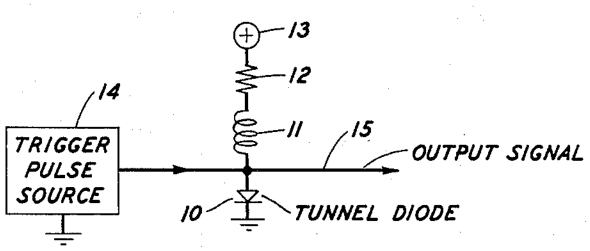
FIG. 1 is a schematic showing of a specific illustrative trigger circuit embodying the principles of the present invention.
Figure 2A:
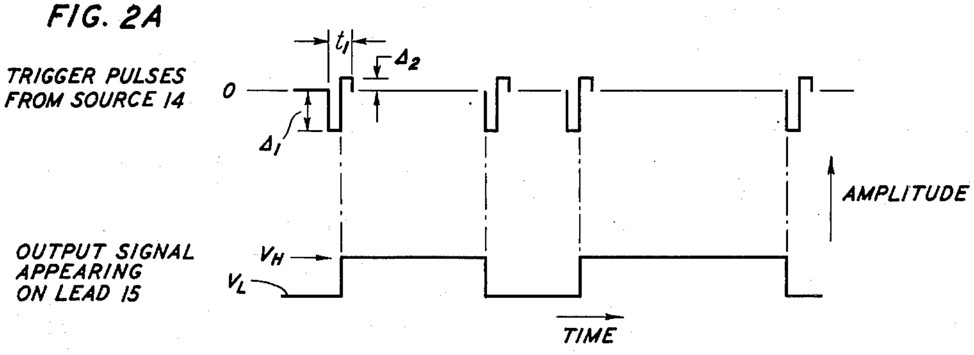
FIGS. 2A and 2B depict input and output waveforms characteristic of the circuit shown in FIG. 1.
Figure 2B:
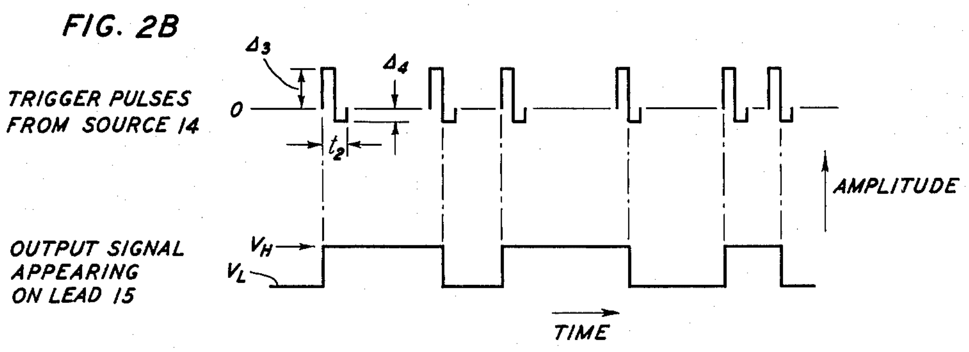
Figure 4:
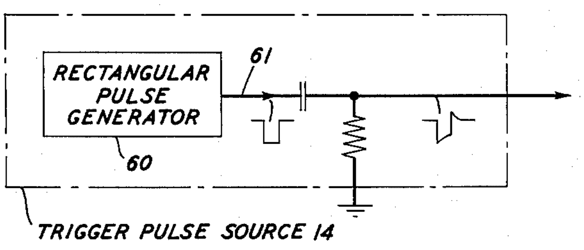
Figure 3A:
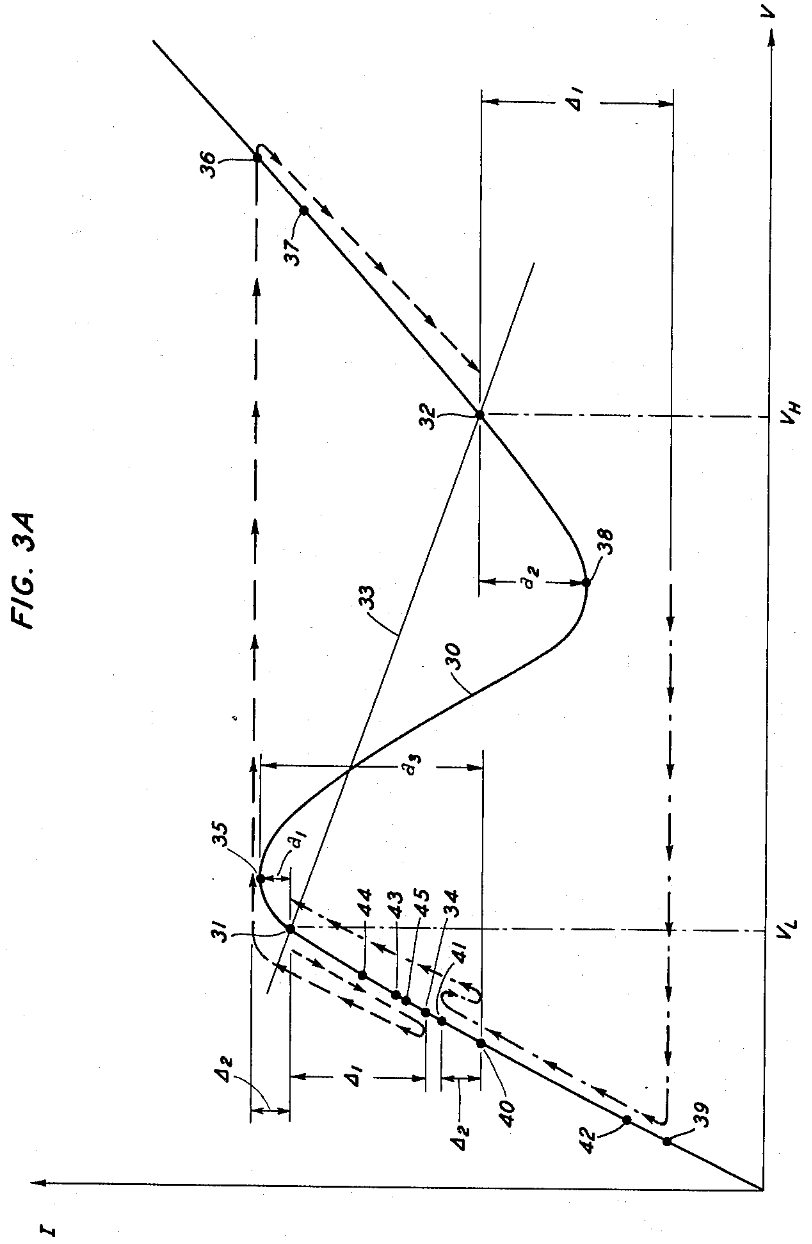
FIG. 3A shows the voltage-current characteristic curve of the negative resistance diode included in the circuit of FIG. 1 and indicates thereon the switching action that the diode undergoes in response to the application thereto of bipolar input pulses of the type represented in FIG. 2A.
Figure 3B:
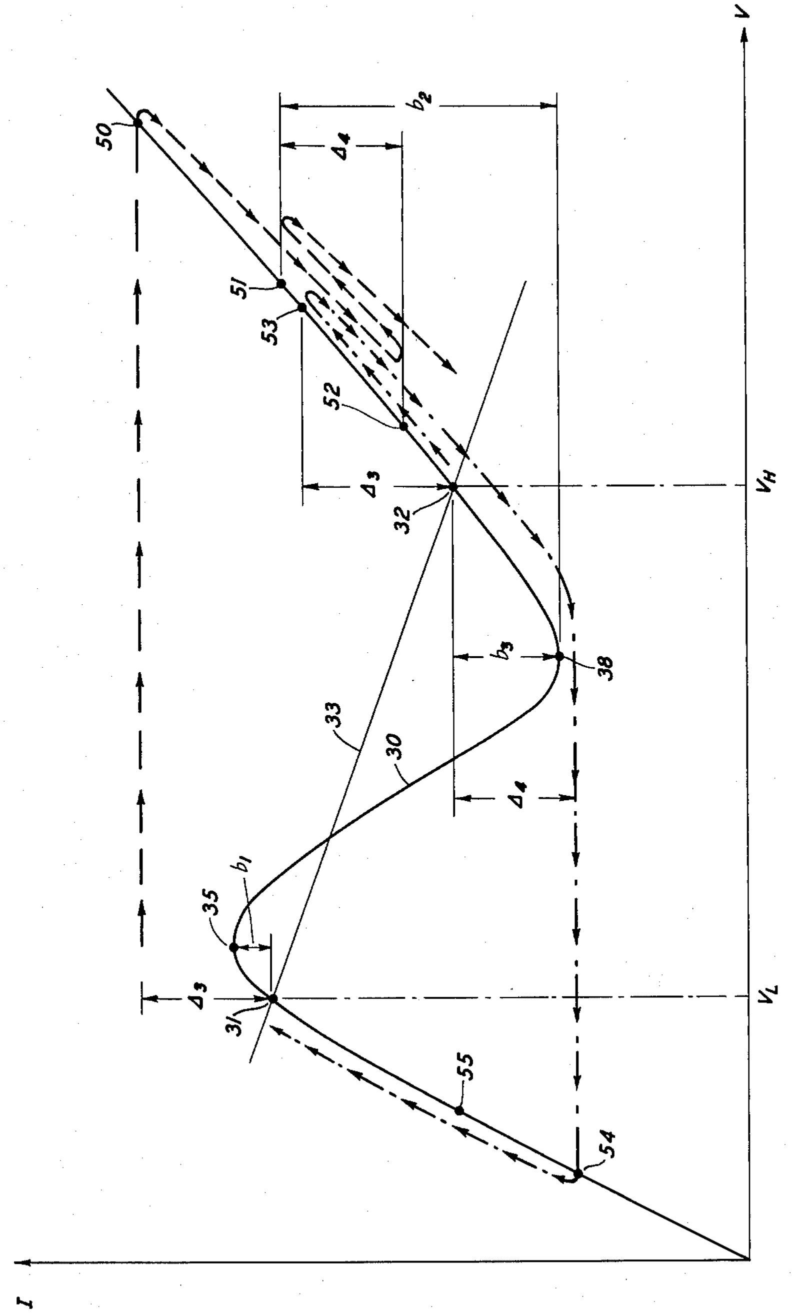

FIG. 3B illustrates the voltage-current characteristic curve of the negative resistance diode included in the circuit of FIG. 1 and indicates thereon the switching action that the diode undergoes in response to the application thereto of bipolar input pulses of the type represented in FIG. 2B; and FIG. 4 shows an exemplary trigger pulse source of the type which may be included in the circuit of FIG. 1.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January–March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Referring now to FIG. 1, there is shown a specific illustrative trigger circuit embodying the principles of the present invention. The circuit includes a tunnel diode 10 connected in series with an inductor 11, a resistor 12, and a positive bias source 13. The values of the resistor 12 and the source 13 are selected to bias the diode 10 for bistable operation. Connected in parallel with the diode 10 is a trigger pulse source 14. Output signals indicative of the condition of the circuit appear on lead 15.

FIG. 2A illustrates one type of bipolar trigger pulse which is effective to switch the circuit shown in FIG. 1 from one to the other of its two stable conditions. The illustrated pulses are identical in form and each extends first in a negative direction and then in a positive direction. The following parameters of each of the bipolar trigger pulses shown in FIG. 2A are critical and must be selected in accordance with the specific requirements therefor set forth hereinbelow in connection with the description of FIG. 3: the pulse width $t_1$, the minimum amplitude of the negative excursion $\Delta_1$ of each pulse, and the maximum and minimum amplitudes of the positive excursion $\Delta_2$ of each pulse.

Also illustrated in FIG. 2A is the waveform of the signal which appears on the output lead 15 of the circuit shown in FIG. 1. The voltage level of the output signal waveform changes from $V_L$ to $V_H$ or vice versa each time that a trigger pulse is applied to the diode 10 of FIG. 1. As shown in FIG. 2A, the output signal waveform changes from the level $V_L$, which is representative of one stable condition of the diode 10, to the level $V_H$, which is representative of the other or high voltage stable condition of the diode 10, in approximate time coincidence with the transition of a trigger pulse from a negative to a positive value. On the other hand, if the diode 10 of FIG. 1 should be in a relatively high voltage stable condition, at the level $V_H$, the application of a trigger pulse thereto causes the diode to switch to its relatively low voltage stable condition, to the level $V_L$, in approximate time coincidence with the occurrence of the leading edge of the trigger pulse.

FIG. 2B illustrates another type of bipolar trigger pulse which is effective to successively switch the circuit shown in FIG. 1 from one to the other of its two stable conditions. The illustrated pulses are identical in form and each extends first in a positive direction and then in a negative direction. The following parameters of the bipolar trigger pulses shown in FIG. 2B are critical and must be selected in accordance with the specific requirements therefor set forth hereinbelow in connection with the description of FIG. 3B: the pulse width $t_2$, the minimum amplitude of the positive excursion $\Delta_3$ of each pulse, and the maximum and minimum amplitudes of the negative excursion $\Delta_4$ of each pulse.

Also illustrated in FIG. 2B is the waveform of the signal which appears on the output lead 15 of the circuit shown in FIG. 1. The voltage level of the output signal waveform changes from $V_L$ to $V_H$ or vice versa each time that a trigger pulse is applied to the diode 10 of FIG. 1. More specifically, and as shown in FIG. 2B, the output signal waveform changes from the level $V_L$ to the level $V_H$ in approximate time coincidence with the occurrence of the leading edge of a trigger pulse, and changes from the level $V_H$ to the level $V_L$ in approximate time coincidence with the transition of a trigger pulse from a positive to a negative value.

Turning now to FIG. 3A, there is shown the voltage-current characteristic curve 30 of the negative resistance diode 10 which is included in the circuit of FIG. 1. The curve 30 includes two stable operating points 31 and 32 which are defined by the intersection of load line 33 with curve 30. It is noted that the relatively low voltage corresponding to the operating point 31 is marked on the voltage axis of FIG. 3A as $V_L$ and that the relatively high voltage corresponding to the operating point 32 is there marked $V_H$.

Assume that the diode 10 shown in FIG. 1 is initially biased at the stable operating point 31 of the characteristic curve 30 of FIG. 3A and that a trigger pulse of the form shown in FIG. 2A is then applied by the source 14 to the diode 10. The negative swing $\Delta_1$ of the trigger pulse causes the operating point of the diode 10 to shift to point 34 on the relatively low voltage positive resistance portion of the curve 30. Then, as the trigger pulse returns to a zero reference level, the operating point returns to the initial point 31, and, as the pulse swings in a positive direction by the amount $\Delta_2$, the operating point of the diode switches over the peak point 35 of the curve 30 to the relatively high voltage positive resistance region thereof, specifically, to point 36. When the trigger pulse returns to the reference level, the operating point of the diode shifts to point 37, and then, as the magnetic field about the inductor 11 of FIG. 1 collapses, the operating point charges from the point 37 to the relatively high voltage stable operating point 32. Thus, a trigger pulse of the form shown in FIG. 2A is effective to switch the diode 10 from the point 31 to the point 32 provided that the positive amplitude $\Delta_2$ of the pulse is greater than the amplitude $a_1$ which corresponds to the vertical distance between the point 31 and the peak point 35.

Now, with the diode 10 at the relatively high voltage stable operating point 32 of the characteristic curve 30 of FIG. 3A, assume that another trigger pulse of the form shown in FIG. 2A is applied by the source 14 to the diode 10. The negative swing $\Delta_1$ of the trigger pulse causes the operating point of the diode 10 to switch past the valley point 38 of the curve 30 to the relatively low voltage positive resistance region thereof, specifically, to point 39. When the waveform of the trigger pulse returns to the reference level, the operating point of the diode 10 shifts to point 40 and then, as the pulse swings in a positive direction by the amount $\Delta_2$, the operating point of the diode shifts from the point 40 to point 41. Subsequently, as the waveform of the trigger pulse returns to the reference level, the operating point of the diode shifts back to the point 40. Finally, as the magnetic field about the inductor 11 of FIG. 1 collapses, the operating point of the diode 10 charges from the point 40 to the stable point 31.

If the magnetic field about the inductor 11 starts to collapse during the time in which the trigger pulse source 14 maintains the negative amplitude $\Delta_1$ across the diode 10, the effect thereof is to shift the operating point of the diode 10 upward on the relatively low voltage positive resistance region of the curve 30, say, from the point 39 to point 42. In such a case, the subsequent transition of the trigger pulse waveform from the negative amplitude $\Delta_1$ to the positive amplitude $\Delta_2$ causes the operating point to shift to point 43. Then, assuming that the magnetic field about the inductor 11 also collapses to some extent during the time in which the trigger pulse source 14 maintains the positive amplitude $\Delta_2$ across the diode 10, the operating point shifts upward during that time from the point 43 to point 44. Finally, when the trigger pulse waveform returns to the reference level, the operating point of the diode 10 shifts to point 45, from which, as the magnetic field about inductor 11 further collapses, the operating point charges upward to the stable point 31.

The extent to which the magnetic field about the inductor 11 collapses during the existence of the negative and positive excursions of the trigger pulse, i.e., during the time designated $t_1$ in FIG. 2A, may be made negligible by choosing the $L/R$ time constant of the circuit of FIG. 1 to be significantly greater, for example, five times greater, than the time duration $t_1$. Under such conditions, the operating point of the diode 10 rests at the point 40 of the curve 30 at the termination of a trigger pulse.

Thus, a trigger pulse of the form shown in FIG. 2A is effective to switch the diode 10 from the point 32 to the point 31 provided (1) that the negative amplitude $\Delta_1$ of the pulse is greater than the amplitude $a_2$ which corresponds to the vertical distance between the point 32 and the valley point 38; (2) that the $L/R$ time constant of the circuit of FIG. 1 is significantly greater than the time $t_1$; and (3) that the positive amplitude $\Delta_2$ of the pulse is less than the amplitude $a_3$ which corresponds to the vertical distance between the point 40 and the peak point 35. Requirement No. 1 assures that the diode 10 will be switched by a trigger pulse from the relatively high voltage region of the curve 30 to the relatively low voltage region thereof, and the second and third above-specified requirements assure that the diode 10 will not be switched back to the relatively high voltage region by the same trigger pulse.

If the $L/R$ time constant of the circuit of FIG. 1 is not made significantly greater than the time $t_1$, the magnetic field about the inductor 11 will, as described above, collapse to some extent during the time $t_1$. This is tolerable if the maximum positive amplitude $a_3$ which a trigger pulse may assume is under such conditions reduced by at least the amount by which the operating point of the diode charges upward on the relatively low voltage positive resistance region of the curve 30 during the time $t_1$.

Turning now to FIG. 3B, there are shown the voltage-current characteristic curve of the negative resistance diode 10 of FIG. 1, the load line 33, and the relatively low and relatively high stable operating points 31 and 32, respectively, which are defined by the intersection of the line 33 with the curve 30.

Assume that the diode 10 shown in FIG. 1 is initially biased at the stable operating point 31 of the characteristic curve 30 of FIG. 3B and that a trigger pulse of the form shown in FIG. 2B is then applied by the source 14 to the diode 10. The positive swing $\Delta_3$ of the trigger pulse causes the operating point of the diode 10 to switch over the peak point 35 of the curve 30 to the relatively high voltage positive resistance region thereof, specifically, to point 50. When the trigger pulse returns to the reference level, the operating point of the diode shifts to point 51, and when the pulse swings in a negative direction by the amount $\Delta_4$, the operating point of the diode shifts to point 52. Subsequently, as the waveform of the trigger pulse returns to the reference level, the operating point shifts back to the point 51. Finally, as the magnetic field about the inductor 11 of FIG. 1 collapses, the operating point of the diode 10 charges from the point 51 to the stable point 32.

Thus, a trigger pulse of the form shown in FIG. 2B is effective to switch the diode from the point 31 to the point 32 provided (1) that the positive amplitude $\Delta_3$ of the pulse is greater than the amplitude $b_1$ which corresponds to the vertical distance between the stable point 31 and the peak point 35 of the curve 30 of FIG. 3B; (2) that the $L/R$ time constant of the circuit of FIG. 1 is significantly greater than the time designated $t_2$ in FIG. 2B; and (3) that the negative amplitude $\Delta_4$ of the trigger pulse is less than the amplitude $b_2$ which corresponds to the vertical distance between the point 51 and the valley point 38. Requirement No. 1 assures that the diode 10 will be switched by a trigger pulse from the relatively low voltage region of the curve 30 to the relatively high voltage region thereof, and the second and third requirements assure that the diode 10 will not be switched back to the relatively low voltage region by the same trigger pulse.

If the $L/R$ time constant of the circuit of FIG. 1 is not made significantly greater than the time duration $t_2$, the magnetic field about the inductor 11 will collapse to some extent during the time $t_2$. This is tolerable if the maximum negative amplitude $b_2$ which a trigger pulse may assume is under such conditions reduced by at least the amount by which the operating point of the diode charges downward on the relatively high voltage positive resistance region of the curve 30 during the time $t_2$.

Now, with the diode 10 biased at the relatively high voltage stable operating point 32 of the characteristic curve 30 of FIG. 3B, assume that another trigger pulse of the form shown in FIG. 2B is applied by the source 14 to the diode 10. The positive swing $\Delta_3$ of the trigger pulse causes the operating point of the diode 10 to shift to point 53 on the relatively high voltage portion of the curve 30. Then, as the trigger pulse returns to a zero reference level, the operating point returns to the initial point 32, and when the pulse swings in a negative direction by the amount $\Delta_4$, the operating point of the diode switches past the valley point 38 of the curve 30 to the relatively low voltage region thereof, specifically, to point 54. When the trigger pulse returns to the reference level, the operating point of the diode shifts to point 55, and then, as the magnetic field about the inductor 11 of FIG. 1 collapses, the operating point of the diode 10 charges from the point 55 to the relatively low voltage stable operating point 31. Thus, a trigger pulse of the form shown in FIG. 2B is effective to switch the diode 10 from the point 32 to the point 31 provided that the negative amplitude $\Delta_4$ of the pulse is greater than the amplitude $b_3$ which corresponds to the vertical distance between the stable point 32 and the valley point 38.

Although the trigger pulses depicted in FIGS. 2A and 2B are represented as being asymmetrical in form, it is to be understood that the trigger pulse waveforms may, if desired, be symmetrical in shape as long as the time and amplitude requirements therefor set forth above are satisfied. Furthermore, with respect to a trigger pulse of the form shown in FIG. 2A it is to be understood that while the amplitude $\Delta_1$ of the negative excursion thereof must be greater than a prescribed amplitude, as specified in detail hereinabove, there is no upper limit on the maximum negative amplitude thereof. Similarly, with respect to a trigger pulse of the form shown in FIG. 2B, the positive amplitude thereof must be greater than a prescribed amplitude, but otherwise the positive swing may be arbitrarily large.

FIG. 4 depicts an exemplary trigger pulse source of the type which may be included in the circuit of FIG. 1 as the source 14 thereof. The source shown in FIG. 4 includes a conventional pulse generator 60 which applies negative-going rectangular pulses to lead 61. In turn, the rectangular pulses are applied to a long time constant RC differentiating circuit of a known form, thereby to provide at the output of the exemplary source pulses of the general form of those shown in FIG. 2A.

Alternatively, the generator 60 of FIG. 4 may be arranged to supply positive-going rectangular pulses to the lead 61, in which case the output of the exemplary source comprises pulses of the general form shown in FIG. 2B.

Furthermore, trigger pulses of the form shown in FIG. 2A or FIG. 2B may be obtained by other well-known pulse-forming expedients. For example, differentiation of a triangular waveform by means of a short time constant RC differentiating circuit, and short-circuited delay line techniques, are suitable for providing such pulses.

It is noted that the operation of the specific illustrative trigger circuit described herein may be controlled in a conventional manner by applying gating signals thereto, and that a plurality of such gated trigger circuits may be then combined to form a simple high speed counter whose organization is essentially the same as that of the counter disclosed in my copending application Serial No. 39,117, filed June 27, 1960, now patent 3,116,425, issued December 31, 1963.

It is emphasized that although particular attention herein has been directed to the use of tunnel diodes as the negative resistance diodes of the above-described circuit, other two-terminal voltage-controlled negative resistance arrangements having characteristics of the general type shown in FIGS. 3A and 3B may also be used therefor.

Finally, it is to be understood that the above-described arrangements are only illustrative of the application of the principles of the present invention. Numerous other arrangements may be devised by those skilled in the art without departing from the spirit and scope of the invention.

What is claimed is:

1. In combination in a trigger circuit, a voltage-controlled negative resistance diode, an inductor connected in series with said diode, means for biasing said diode for bistable operation, and means connected in parallel with said diode for supplying thereto trigger pulses each of which is characterized by both a positive and a negative excursion, the trailing edge of one of said excursions of each pulse coinciding approximately with the leading edge of the other one of said excursions whereby said diode alternates from one stable state to the other in respective response to the application thereto of each of said pulses.

2. A combination as in claim 1 wherein said trigger pulse supplying means comprises rectangular pulse generating means and long time constant differentiating means responsive to the output of said generating means.

3. In combination in a trigger circuit, a circuit path including a tunnel diode, an inductor connected in series with said diode, a resistor connected in series with said inductor, and a direct-current bias source connected in series with said resistor, said resistor and said source having values which bias said diode for bistable operation, said circuit path being characterized by an inductive time constant which is defined as $L/R$ where L equals the value in henries of said inductor and R equals the value in ohms of said resistor, and means connected in parallel with said diode for supplying thereto identical bipolar trigger pulses the time duration of each of which is at least one-fifth the value of said inductive time constant and each of which is effective to switch said diode from one stable state to the other stable state.

4. In combination in a trigger circuit, a voltage-controlled negative resistance diode whose voltage-current characteristic curve exhibits a peak point and a valley point, an inductor connected in series with said diode, means for biasing said diode for bistable operation at relatively low and relatively high voltage stable operating points, and trigger source means connected in parallel with said diode for supplying thereto identical bipolar pulses each of which is characterized by contiguous positive and negative excursions and each of which is effective to switch said diode from one to the other of said stable points.

5. A combination as in claim 4 wherein said voltage-controlled negative resistance diode is a tunnel diode.

6. A combination as in claim 5 wherein each of the bipolar pulses supplied to said diode from said source means extends first in a negative direction and then in a positive direction.

7. A combination as in claim 6 wherein the negative excursion of each of said pulses is greater than the amplitude represented by the vertical distance between said relatively high voltage stable operating point and said valley point, wherein the postive excursion of each of said pulses is greater than the amplitude represented by the vertical distance between said relatively low voltage stable operating point and said peak point and is less than the amplitude represented by the vertical distance between said relatively high voltage stable operating point and said peak point, and wherein the time duration of each of said pulses is significantly less than the inductive time constant of said circuit.

8. A combination as in claim 5 wherein each of the bipolar pulses supplied to said diode from said source means extends first in a positive direction and then in a negative direction.

9. A combination as in claim 8 wherein the positive excursion of each of said pulses is greater than the amplitude represented by the vertical distance between said relatively low voltage stable operating point and said peak point, wherein the negative excursion of each of said pulses is greater than the amplitude represented by the vertical distance between said relatively high voltage stable operating point and said valley point and is less than the amplitude represented by the vertical distance between said relatively low voltage stable operating point and said valley point, and wherein the time duration of each of said pulses is significantly less than the inductive time constant of said circuit.

10. In combination in a trigger circuit, a tunnel diode whose voltage-current characteristic curve exhibits a peak point and a valley point, an inductor connected in series with said diode, means for biasing said diode for bistable operation at relatively low and relatively high voltage stable operating points, trigger source means connected in parallel with said diode for supplying thereto identical bipolar pulses each of which comprises a first excursion of one polarity and a contiguous second excursion of the opposite polarity to switch said diode from one to the other of said stable points in respective response to the application thereto of each of said pulses.

References Cited by the Examiner

UNITED STATES PATENTS

| | | | |
|---|---|---|---|
| 2,820,153 | 1/58 | Woll | 307—88.5 |
| 2,944,164 | 7/60 | Odell et al. | 307—88.5 |
| 2,975,304 | 3/61 | Price et al. | 307—88.5 |
| 2,986,724 | 5/61 | Jaeger | 307—88.5 |
| 3,015,048 | 12/61 | Noyce | 307—88.5 |
| 3,040,186 | 6/62 | Van Duzer | 307—88.5 |
| 3,053,998 | 9/62 | Chynoweth et al. | 307—88.5 |
| 3,076,944 | 2/63 | Watters | 307—88.5 |
| 3,103,597 | 9/63 | Novick et al. | 307—88.5 |

OTHER REFERENCES

"Tunnel Diodes as High-Frequency Devices," by H. S. Sommers, Jr., Proceedings of the IRE, July 1959, pages 1202–1206.

JOHN W. HUCKERT, *Primary Examiner.*

GEORGE N. WESTBY, *Examiner.*